US006879743B2

(12) United States Patent
Bhowmik et al.

(10) Patent No.: US 6,879,743 B2
(45) Date of Patent: Apr. 12, 2005

(54) CRYSTAL-CORE FIBER MODE CONVERTER FOR LOW-LOSS POLARIZATION-INSENSITIVE PLANAR LIGHTWAVE CIRCUITS

(75) Inventors: Achintya K. Bhowmik, San Jose, CA (US); Nagesh K. Vodrahalli, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 10/028,570

(22) Filed: Dec. 19, 2001

(65) Prior Publication Data

US 2003/0113052 A1 Jun. 19, 2003

(51) Int. Cl.[7] ................................................ G02B 6/12
(52) U.S. Cl. ............................. 385/14; 385/11; 385/34; 385/49; 385/122; 385/129; 385/130; 385/131; 385/132
(58) Field of Search ............................ 385/11, 34, 28, 385/37, 49, 122, 129, 130, 131, 132, 14

(56) References Cited

U.S. PATENT DOCUMENTS

| | | | | |
|---|---|---|---|---|
| 4,077,699 A | * | 3/1978 | Dyott et al. ................... | 385/11 |
| 4,634,215 A | * | 1/1987 | Reule ........................... | 385/43 |
| 4,640,615 A | * | 2/1987 | Sasaki ......................... | 356/130 |
| 5,082,349 A | * | 1/1992 | Cordova-Plaza et al. ....... | 385/2 |
| 5,218,654 A | * | 6/1993 | Sauter ........................... | 385/24 |
| 5,414,548 A | * | 5/1995 | Tachikawa et al. .......... | 359/130 |
| 5,694,496 A | * | 12/1997 | Ando et al. .................... | 385/11 |

| | | |
|---|---|---|
| 2001/0024538 A1 | 9/2001 | Khosravani et al. |

FOREIGN PATENT DOCUMENTS

| | | |
|---|---|---|
| JP | 01257921 | 10/1989 |
| JP | 08226822 | 9/1996 |
| WO | WO 00/73838 A1 | 12/2000 |

OTHER PUBLICATIONS

"Guided–Wave Directional Couplers with Polarisation Maintaining Fibre Arrays," Electronics Letters, Feb. 14, 1991, vol. 27, No. 4, pp. 303–304.
Y. Inoue et al., "Polarization Mode Converter With Polyimide Half Waveplate in Silica–Based Planar Lightwave Circuits," 8342 IEEE Photonics Technology Letters, No. 5, May 6, 1994, pp. 4–6, New York, USA.
K. Hirabayashi et al., "Variable and Rotatable Waveplates of PLZT Electrooptic Ceramic Material on Planar Waveguide Circuits," IEEE Photonics Technology Letters, vol. 14, No. 7, Jul. 2002, pp. 956–958, USA.
PCT Search Report, PCT/US 02/38215, Date completed: Apr. 8, 2003, pp. 1–5.

* cited by examiner

Primary Examiner—Robert H. Kim
Assistant Examiner—Michael H Caley
(74) Attorney, Agent, or Firm—Kevin A. Reif

(57) ABSTRACT

A planar lightwave circuit comprises a first portion of a waveguide, a second portion of a waveguide, and a segment of crystal core fiber coupling the first portion to the second portion of the waveguide. The crystal core fiber helps to reduce the polarization sensitivity of the waveguide. In one embodiment, multiple crystal core fibers are used in a planar lightwave circuit having multiple waveguides, such as an array waveguide grating.

21 Claims, 3 Drawing Sheets

CRYSTAL-CORE FIBER MODE CONVERTER FOR LOW-LOSS POLARIZATION-INSENSITIVE PLANAR LIGHTWAVE CIRCUITS

BACKGROUND OF THE INVENTION

1. Field of the Invention

The described invention relates to the field of optical systems. In particular, the invention relates to creating low-loss polarization-insensitive planar lightwave circuits.

2. Description of Related Art

Planar lightwave circuits (PLCs) are systems that include, but are not limited to, waveguides, light sources, and/or detectors in the plane of the circuit. PLCs often have been based on silica-on-silicon (SOS) technology.

FIG. 1 is a schematic diagram that shows a typical SOS architecture. A layer of lower cladding 12 is typically deposited onto a substrate 10. A waveguide core layer 20 is deposited over the lower cladding 12, and an upper cladding 24 is deposited over the waveguide core layer 20. In one example, the substrate 10 may be silicon, the lower cladding 12 may be $SiO_2$, the core layer 20 may be $SiO_2$ doped with Germanium, and the upper cladding 24 may be a borophosphosilicate glass (BPSG).

One issue with planar lightwave circuits, and SOS-based devices in particular, is the birefringence in the waveguides. Birefringence may arise due to thin-film stress and makes these devices polarization sensitive. Thus, the output of the PLC may vary dependent upon the polarization of the input.

FIG. 2 is a schematic diagram that shows a prior art method of reducing the polarization sensitivity of a planar lightwave circuit, such as that described in *Polarization Mode Converter with Polyimide Half Waveplate in Silica-Based Planar Lightwave Circuits*, IEEE Photonics Technology Letter, Vol. 6, No 5, May 1994 by Inoue, Ohmori, Kawachi, Ando, Swada, and Takahashi. A groove 30 is cut into the middle of a planar lightwave circuit 32, and a rectangular half waveplate is inserted into the groove. The half waveplate 40 is angled at a 45-degree angle with the plane of the substrate of the planar lightwave circuit. An optical input 50 traverses the first half of the PLC, and is mode converted by the half waveplate before traversing the second half of the PLC. This results in an output 52 of the PLC that is polarization insensitive.

However, due to lack of lateral optical confinement in the half waveplate, the mode profile of the optical signal expands and results in excess loss in the device. To minimize the loss, an extremely thin half waveplate is used. In one case, the half waveplate is approximately 15 microns thick. However, the reduced thickness of the half waveplate is limited due to fragility, thickness uniformity, and handling difficulties.

DETAILED DESCRIPTION

A method and apparatus for reducing the polarization sensitivity of a planar lightwave circuit is disclosed. A planar lightwave circuit comprises a first portion of a waveguide, a second portion of a waveguide, and a segment of crystal core fiber (CCF) coupling the first portion to the second portion of the waveguide. The CCF helps to reduce the polarization sensitivity of the waveguide. In one embodiment, multiple CCFs are used in a PLC having multiple waveguides, such as in an array waveguide grating.

Figure 1:
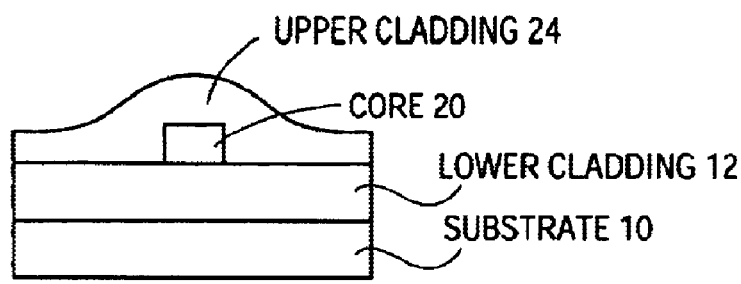
FIG. 1 is a schematic diagram that shows a typical SOS architecture.
Figure 2:
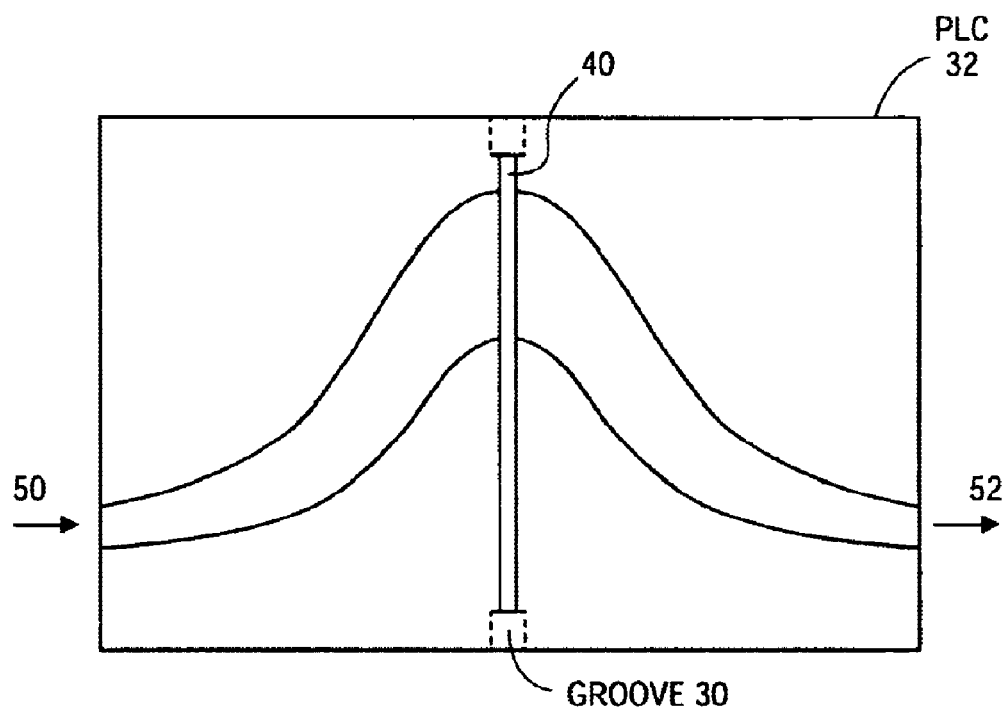
FIG. 2 is a schematic diagram that shows a prior art method of reducing the polarization sensitivity of a planar lightwave circuit.
Figure 3:
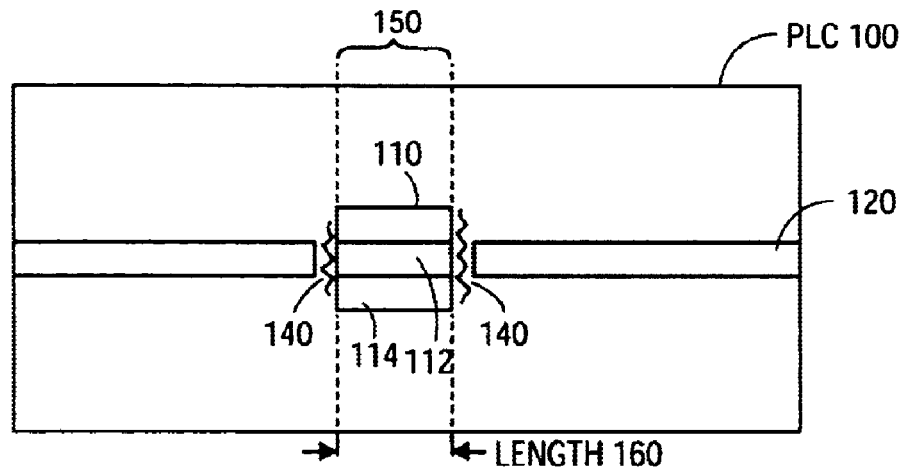
FIG. 3 is a diagram that shows one embodiment of a top view of a PLC having a CCF inserted into a waveguide.

FIG. 3 is a diagram that shows one embodiment of a top view of a PLC 100 having a CCF 110 inserted into a waveguide 120. The CCF 110 comprises a core section 112 and an outer cladding 114. In one embodiment, the CCF 110 is inserted at a mid section of the PLC 100, and the dimensional parameters and refractive indices of the CCF 110 are chosen to ensure single-mode operation and appropriate matching of the fundamental mode shape to that in the waveguide for low-loss operation.

In one embodiment, the CCF 110 acts as a polarization mode converter in the mid section of the PLC 100. An optical signal traverses a first half of the PLC; its polarization is flipped by the mode converter; and then the optical signal traverses the second half of the PLC 100. By placing the CCF 110 at a mid section of the PLC 100, the mode conversion causes the polarization of the optical signal exiting the CCF 110 to be rotated by 90 degrees with respect to the polarization direction of the optical signal entering the CCF 110. Traversing the first half with a first polarization and traversing the second half of the PLC 100 with a flipped polarization cancels out the polarization sensitivity of the PLC 100.

In one embodiment, a groove 150 is made in the PLC's substrate to allow the insertion of the CCF 110, and an index-matched gel 140 may be inserted at the interfaces of the CCF 110 and the waveguide 120.

The CCF 110 has two principal axes, x and y, or the fast and slow axes. These two principal axes are determined by the crystalline structure of the CCF.

In one embodiment, the CCF is positioned to have one of its principal axes at 45 degrees angle from the plane of the PLC, and the length 160 of the CCF is selected to satisfy the equation:

length=$(2m+1)*\lambda/(2*\Delta n)$, where m is a non-negative integer, $\lambda$ is a wavelength of an optical signal at an optical communication wavelength, and $\Delta n$ is a measure of birefringence of the CCF and is equal to $n_y-n_x$, or the difference in refractive indices of the y- and x-polarization components along the principal axes. m may be chosen such that the length of the CCF is convenient to work with. In one embodiment, $\lambda$ may be an optical communication wavelength in the waveband range of approximately 800 nm to 1700 nm, but may be expanded to other future optical communication waveband ranges.

In one embodiment, the CCF comprises any of a variety of crystalline materials, including, but not limited to inorganic substances such as quartz, lithium niobate, lithium borate, beta-barium borate, etc., or organic and polymeric substances. The outer cladding of the CCF may comprise similar or dissimilar material having a slightly lower index of optical refraction than the core material.

Figure 4:
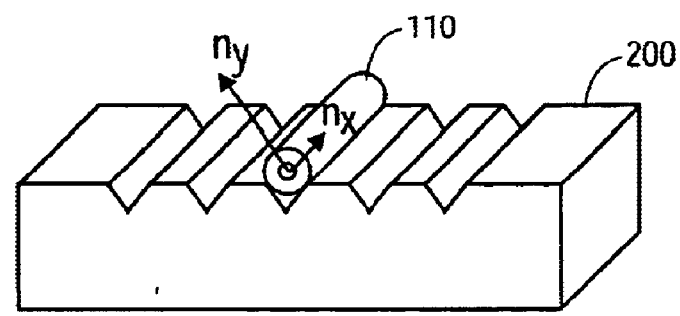
FIG. 4 is a schematic diagram showing the CCF bonded to a V-groove substrate.

FIG. 4 is a schematic diagram showing the CCF 110 bonded to a V-groove substrate 200. In one embodiment, the entire V-groove substrate 200 may be inserted into the groove 150 shown in FIG. 3. This allows a more convenient and flexible way to handle the CCF 110.

The CCF 110 is bonded with its principal axes at a 45 degree angle from the plane of the V-groove substrate 200. Thus, when the V-groove substrate is inserted into the groove 150, the CCF 110 will have the desired orientation.

Figure 5:
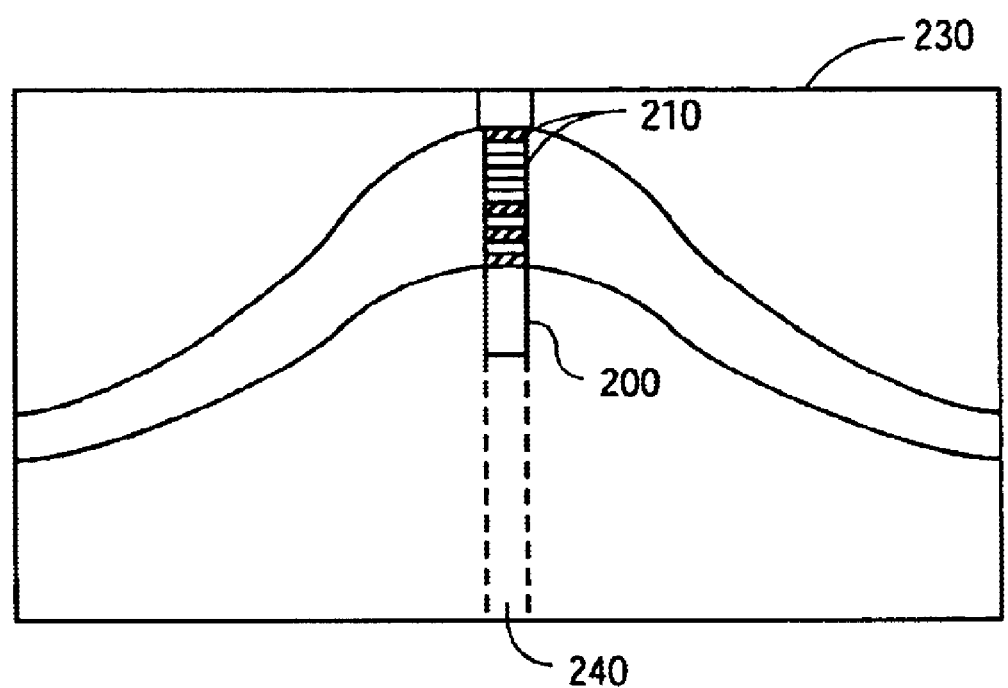
FIG. 5 is a schematic diagram showing a plurality of CCFs inserted into a PLC having multiple waveguides, such as an array waveguide grating.

FIG. 5 is a schematic diagram showing a plurality of CCFs 210 inserted into a PLC 230 having multiple waveguides, such as an array waveguide grating. In one embodiment the CCFs 210 are bonded to a V-groove substrate 200 prior to making a groove 240 in the PLC 230 and inserting the V-groove substrate 200 into the PLC 230. The precision spacing of the V-grooves allows easy alignment of the CCFs 210 to the waveguides of the PLC 230.

Thus, a method and apparatus for reducing the polarization sensitivity of a planar lightwave circuit is disclosed. However, the specific embodiments and methods described herein are merely illustrative. For example, although some embodiments were described with respect to SOS technology, the embodiments are not limited to that technology. Numerous modifications in form and detail may be made without departing from the scope of the invention as claimed below. The invention is limited only by the scope of the appended claims.

What is claimed is:

1. A planar lightwave circuit comprising:
   a first portion of a planar waveguide on a substrate;
   a second portion of the planar waveguide on the substrate; and
   a segment of crystal core fiber positioned in a groove in the substrate coupling the first portion of the planar waveguide with the second portion of the planar waveguide.

2. The planar lightwave circuit of claim 1 further comprising:
   an optical index-matching gel disposed between the segment of crystal core fiber and the first portion and second portion of the waveguide.

3. The planar lightwave circuit of claim 1, wherein the segment of crystal core fiber has a principal optical axis disposed at approximately a 45-degree angle with the planar lightwave circuit.

4. The planar lightwave circuit of claim 1, wherein the planar lightwave circuit is an array waveguide grating.

5. The planar lightwave circuit of claim 4, wherein the segment of crystal core fiber is disposed at a mid section of the array waveguide grating.

6. The planar lightwave circuit of claim 4, wherein the segment of crystal core fiber has a length that satisfies the equation $(2m+1)*\lambda/(2*\Delta n)$, wherein m is any non-negative integer, $\lambda$ is a wavelength of an optical signal in an optical communication waveband range, and $\Delta n$ is a measure of birefringence of the segment of crystal core fiber.

7. The planar lightwave circuit of claim 6, wherein the optical communication waveband range is approximately 800 nm to 1700 nm.

8. The planar lightwave circuit of claim 6, wherein the segment of crystal core fiber comprises quartz, lithium niobate, lithium borate, beta-barium borate or other inorganic substance.

9. The planar lightwave circuit of claim 6, wherein the segment of crystal core fiber comprises an organic or polymeric substance.

10. An array waveguide grating comprising:
    a plurality of waveguides;
    a V-groove portion of substrate having multiple segments of crystal core fibers inserted into a section of the plurality of waveguides.

11. The array waveguide grating of claim 10, further comprising:
    an optical index-matching gel disposed at ends of the multiple segments of crystal core fibers.

12. The array waveguide grating of claim 10, wherein the V-groove portion of substrate is inserted at a midway point of the array waveguide grating.

13. A method of correcting for birefringence in a planar lightwave circuit, the method comprising:
    removing a section of the planar lightwave circuit, and
    inserting a portion of crystal core fiber into the planar lightwave circuit.

14. The method of claim 13, wherein inserting the portion of crystal core fiber further comprises:
    positioning the portion of crystal core fiber to have approximately a 45-degree angle between an optical axis of the portion of crystal core fiber and a substrate plane of the planar lightwave circuit.

15. The method of claim 14, further comprising:
    inserting an index-matched gel between the portion of crystal core fiber and the planar lightwave circuit.

16. The method of claim 13, wherein the portion of crystal core fiber is disposed in a V-groove substrate.

17. The method of claim 16, wherein other portions of crystal core fiber are also disposed in the V-groove substrate.

18. A method of correcting for birefringence in a planar waveguide, the method comprising:
    directing an optical signal down a first segment of the planar waveguide;
    changing a polarization of the optical signal by directing the optical signal through a portion of crystal core fiber; and
    directing the optical signal down a second segment of the planar waveguide.

19. The method of claim 18, further comprising:
    reducing loss of the optical signal between an interface of the portion of crystal core fiber and the planar waveguide by using an index-matched gel.

20. The method of claim 18, wherein the length of the portion of crystal core fiber satisfies the equation $(2m+1)*\lambda/(2*\Delta n)$, wherein m is a non-negative integer, $\lambda$ is a wavelength of the optical signal, and $\Delta n$ is a measure of birefringence of the portion of crystal core fiber.

21. The method of claim 20, wherein $\lambda$ is in an optical waveband range of approximately 800 nm to 1700 run.

* * * * *

UNITED STATES PATENT AND TRADEMARK OFFICE
CERTIFICATE OF CORRECTION

PATENT NO. : 6,879,743 B2 Page 1 of 1
DATED : April 12, 2005
INVENTOR(S) : Bhowmik et al.

It is certified that error appears in the above-identified patent and that said Letters Patent is hereby corrected as shown below:

Column 4,
Line 58, delete "run" and insert -- nm --.

Signed and Sealed this

Fifth Day of July, 2005

JON W. DUDAS
*Director of the United States Patent and Trademark Office*